Nov. 24, 1931.  H. B. TRIX ET AL  1,833,141
RADIATOR SCREEN
Filed Jan. 12, 1931
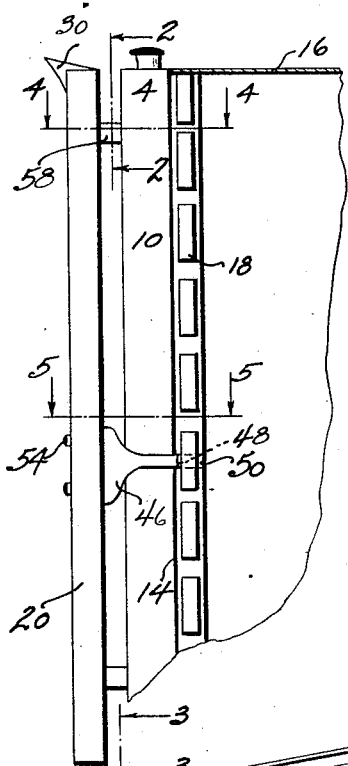
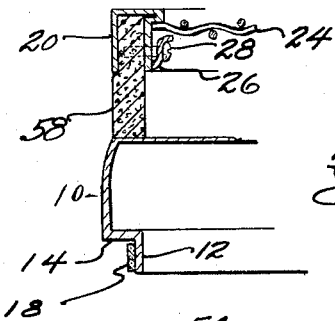
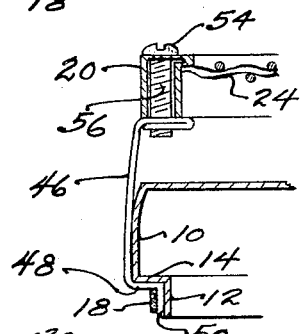
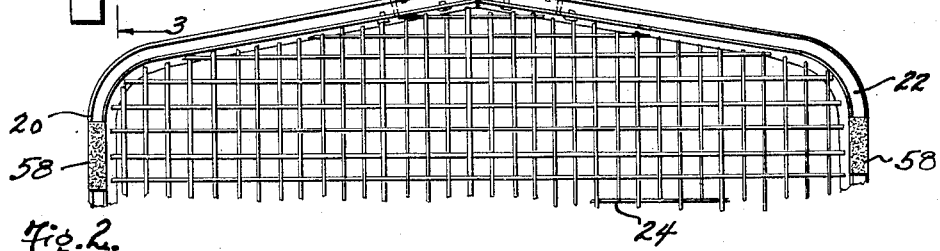
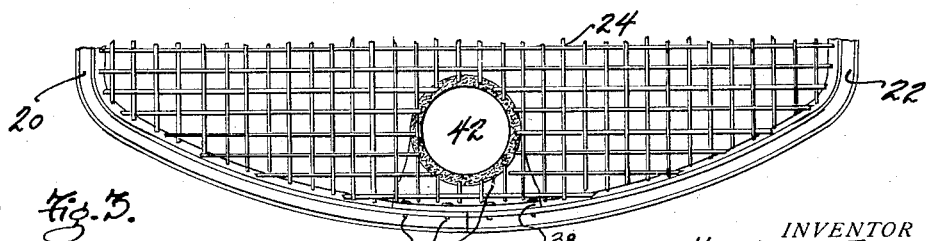
INVENTOR
Herbert B. Trix
Peter G. Metzger
Vernor G. Souder
BY Francis D. Hardesty. ATTORNEY Patented Nov. 24, 1931

1,833,141

UNITED STATES PATENT OFFICE

HERBERT B. TRIX, PETER G. METZGER, AND VERNON G. SOUDER, OF DETROIT, MICHIGAN, ASSIGNORS TO AMERICAN INJECTOR COMPANY, OF DETROIT, MICHIGAN, A CORPORATION OF MICHIGAN

RADIATOR SCREEN

Application filed January 12, 1931. Serial No. 508,030.

This invention relates to that class of automobile accessories commonly known as radiator grilles.

An object of the invention is a radiator grille provided with spring members rigidly fastened to the frame thereof, the members having hooked or inbent ends adapted to hook behind the beads generally provided at the rearside edges of the radiator shell, the ends terminating in free portions adapted to lie under the hood lacings generally provided on radiators.

A still further object is a radiator grille whose frame is composed of complementary C shaped members having upper ends secured to each other and concealed from view by a casting or ornamental configurations which forms the capital for the grille.

A still further object is a grille whose frame is composed of complementary C shaped frame members whose lower ends are secured to each other and may be concealed from view by a part which is provided with a large aperture, adapted to be aligned with the crank receiving aperture of the automobile front, to permit the introduction of a crank to the engine.

A still further object is a grille whose frame is channel shaped in cross section, there being rubber blocks in the channel adapted to abut the radiator, to assist in securing the grille in place.

A still further object is a grille composed of several relatively detachable and removable parts, selected ones of which may be jointed, the construction thus serving to facilitate assembly and replacement of parts. This is quite a feature in simplified manufacturing practice both in assembly cost and plating as the parts can be plated separately with a minimum of rejections for poor plating.

Further, by making the grille of parts which are to be joined after fabrication, the number of parts which a dealer must carry in stock to satisfy all sizes and makes of cars is reduced, as will be clearly understood.

Still further objects will readily occur to those skilled in the art upon reference to the following description and the accompanying drawings in which Fig. 1 is a side view of a portion of an automobile provided with a device embodying the invention.

Figs. 2 to 5 are section views on lines 2—2, 3—3, 4—4, and 5—5 respectively of Fig. 1.

Referring to the drawings, and more particularly to Fig. 1, it will be seen that there is provided an automobile radiator shell 10 having an inset portion 12 providing a bead 14. The inset portion forms a seat for the hood 16 of the vehicle and is provided with hood lacings 18 of any well known type.

Disposed in front of the radiator is a grille, whose details of construction embody the inventions herein disclosed, and hereinafter claimed, the grille being disclosed in our design application, Serial No. D—38292, filed January 12, 1931.

The grille includes a pair of complementary C shaped frame parts 20 and 22, of channel cross section, and a screen or mesh 24 secured therein by a number of small S plates 26 and screws 28 there being cork gaskets (not shown) between the screen and the frame parts.

The upper abutting ends of the frame parts are secured from view by means including a casting 30, secured by screws 32 to the ends of the frame parts. The casting 30 is of ornamental configuration and besides assisting in securing the frame ends to each other, and concealing them from view, also serves to form a capital or ornament for the upper end of the grille, as more fully disclosed in the above mentioned design application.

The lower abutting ends of the frame parts 20 and 22 are secured to each other, in a similar manner, by a part 36 having a flange 38 thru which are passed screws 40 which are threaded into the frame parts. The part 36 is relatively large in area and has a large aperture 42 which is adapted to be aligned with that aperture (not shown) in the automobile front thru which a crank may be introduced to the engine of the automobile.

In order to mount the grille in its place on and in front of the radiator shell, there are detachably secured to the frame a pair of L shaped spring clamps 46 which have hooked ends 48 terminating in free portions 50, the means by which the spring clamps are secured to the grille frame including screws 56 whose heads 54 are accessible from the front of the automobile. When the grille is to be mounted in its place, the hooked ends 48 of the spring clamps 46 are engaged behind the bead 14, and the free portions 50 disposed on the inset portion 12, between the latter and a part of the hood lace 18. The screws 56 are then tightened to complete the mounting operation.

Disposed within the channels of the frame parts are blocks 58 of rubber or other resilient material, which abut the front of the shell 10 to assist in holding the grille in place and to prevent undue rattling of the grille.

Now having described the invention and the preferred embodiment thereof, it is to be understood that the said invention is to be limited, not to the specific details herein set forth, but only by the scope of the claims which follow.

We claim:

1. For use with a conventional radiator shell having a front wall and side walls provided with shoulders forming inset portions, a radiator grille having a marginal frame and means for detachably mounting the grill on and in front of the shell, said means including spaced spring fingers rigidly secured to the grille frame at spaced points on the side edges thereof, and having hooked or inbent ends adapted to detachably hook behind the shoulders formed on said shell.

2. For use with a conventional radiator shell having a front wall and side walls provided with shoulders forming inset portions, a radiator grille having a marginal frame and means for detachably mounting the grille on and in front of the shell, said means including spaced spring fingers rigidly secured to the grille frame at spaced points on the side edges thereof, and having hooked or inbent ends adapted to detachably hook behind the shoulders formed on said shell, the inset portions of the shell having hood lacings thereon under which the free ends of the spring fingers may be disposed.

3. A radiator grille, including an annular frame of channel cross section, resilient blocks disposed in the channel of the frame, and means for mounting the grille on and in front of the radiator, said means including spaced spring fingers rigidly secured to the frame at spaced points on the side edges thereof and having hooked or inbent ends remote from the frame, the ends terminating in free portions parallel to the body of the spring members.

4. A radiator grille including a frame and means for mounting the grille on and in front of a radiator, said means including spring members rigidly secured to the frame and having hooked or inbent ends adapted to hook behind shoulders formed on the side walls of the radiator, the spring members being secured to the frame by screws whose heads are accessible from in front of the frame.

5. A radiator grille including a frame of channel cross section, resilient blocks disposed in the channel of the frame, and means for mounting the grille on and in front of a radiator, said means including spring members rigidly secured to the frame and having hooked or inbent ends remote from the frame, the ends terminating in free portions parallel to the body of the spring members, the spring members being secured to the frame by screws whose heads are accessible from in front of the frame.

6. A radiator grille for automobile fronts including a pair of complementary C shaped frame portions and means for securing abutting upper ends of the sections to each other, said means including a member overlapping the ends so as to conceal them, and detachable fasteners securing said ends to the member, the member being of ornamental configuration so as to form a capital for the grille frame.

7. A radiator grille for automobile fronts including a pair of complementary C shaped frame portions, and means for securing abutting lower ends of the sections to each other, said means including a member overlapping the ends so as to conceal them, and detachable fasteners securing said ends to the member, the latter having an upwardly extending portion provided with an aperture aligned with the crank receiving aperture of the automobile front.

8. A radiator grille for automobile fronts including a pair of complementary C shaped frame portions, and means for securing wire mesh to said frame, said means including a series of S shaped pieces disposed along the inside of the frame and fastened thereto by suitably threaded screws to hold and securely lock the wire mesh in place, and a cushion member between said wire mesh or grille and the C shaped frame portions, said cushion being composed of fabric, cork or other suitable resilient material.

In testimony whereof, we sign this specification.

HERBERT B. TRIX.
PETER G. METZGER.
VERNON G. SOUDER.